United States Patent [19]

Park

[11] Patent Number: 5,764,375
[45] Date of Patent: Jun. 9, 1998

[54] METHOD FOR SEQUENTIALLY AND CONTINUOUSLY TRANSMITTING DOCUMENTS OF DIFFERENT RECEPTION PLACES IN FACSIMILE

[75] Inventor: Sang-Cheol Park, Gumi, Rep. of Korea

[73] Assignee: SamSung Electronics Co., Ltd., Kyungki-do, Rep. of Korea

[21] Appl. No.: 675,897

[22] Filed: Jul. 5, 1996

[30] Foreign Application Priority Data

Jul. 4, 1995 [KR] Rep. of Korea .................. 1995/19485

[51] Int. Cl.⁶ .................................................. H04N 1/00
[52] U.S. Cl. .................................. 358/440; 358/407
[58] Field of Search ........................ 358/400, 407, 358/440, 434, 438, 403

[56] References Cited

U.S. PATENT DOCUMENTS

| | | | |
|---|---|---|---|
| 4,670,791 | 6/1987 | Murata et al. ...................... | 358/440 |
| 5,084,770 | 1/1992 | Nakayama ......................... | 358/403 |
| 5,095,373 | 3/1992 | Hisano ............................... | 358/402 |
| 5,291,305 | 3/1994 | Sakashita et al. .................. | 358/400 |
| 5,384,830 | 1/1995 | Ide ..................................... | 358/403 |
| 5,392,131 | 2/1995 | Umeno ............................... | 358/403 |
| 5,499,109 | 3/1996 | Mathur et al. ..................... | 358/400 |
| 5,535,015 | 7/1996 | Yoshida ............................. | 358/438 |

*Primary Examiner*—Kim Yen Vu
*Assistant Examiner*—Kimberly A. Williams
*Attorney, Agent, or Firm*—Robert E. Bushnell, Esq.

[57] ABSTRACT

A telecommunications process and circuit for sequentially and continuously transmitting documents of different destinations by group-designating and registering the number of pages and facsimile numbers to be transmitted, when a different-place transmission mode is selected; dialing the first facsimile number registered, to thereby transmit the first designated document; detecting whether transmission of the first document transmitted has been completed; and dialing the next group-designated facsimile number after transmission of the first document has been completed, and then sending another document designated.

6 Claims, 3 Drawing Sheets

METHOD FOR SEQUENTIALLY AND CONTINUOUSLY TRANSMITTING DOCUMENTS OF DIFFERENT RECEPTION PLACES IN FACSIMILE

CLAIM OF PRIORITY

This application makes reference to, incorporates the same herein, and claims all benefits according under 35 U.S.C. §119 from a patent application entitled METHOD FOR SEQUENTIALLY AND CONTINUOUSLY TRANSMITTING DOCUMENTS OF DIFFERENT RECEPTION PLACES IN FACSIMILE earlier filed in the Korean Industrial Property Office, on the 4th day of July 1995 and there duly assigned Ser. No. 19485/1995.

BACKGROUND OF THE INVENTION

1. Field of the Invention

The present invention relates to telecommunication processes and apparatus for sequently transmitting different documents to different places at one time when a plurality of documents are to be sent to respectively different places, and, more particularly, to telecommunication processes and apparatus able to accept a single user program defining the number of pages and facsimile numbers for multiple different addresses corresponding to several different documents to be transmitted to different places when the documents are inserted initially.

2. Description of the Related Art

With communications technology currently available, there are increasingly demanding an increase in the variety of services of communication systems. In addition, there have been suggested a variety of telecommunications techniques using document facsimile in homes or offices.

In contemporary telecommunications practice, when facsimile transmissions of a plurality of documents are to be sent to their respective places, the first document is transmitted to its intended destination, and then another document to its intended, albeit different destinations after the previous transmission has been completed. Sometimes the operator desired to send the same document may be sent to several different places at once, which is called sequential transmission. In contemporary practice however, different documents must be sent to their respective destinations in sequence, after completion of each preceding transmission.

Early efforts, such as that represented by the *Image Communication Apparatus* of T. Nakayama, U.S. Pat. No. 5,084,770, attempted to facilitate reserved batch transmission by automatically adding an unique identifier code to each image data file to be transmitted along with the image data, storing sets of image data, transmission conditions and the identifier codes, and then transmitting in a batch, those stored sets of image data that have identical transmission start times and destination data K. Hisano, in U.S. Pat. No. 5,095,373 for *Facsimile Machine Having Store And Forward Mode*, sought to improve upon multiple page facsimile transmission by scanning a plurality of pages of a document, and then allowing the operator to make a first designation of a plurality of destinations by their telephone numbers, and a second designation of those pages of a single document to be transmitted to each of the destinations. Transmission management files are created for each of the destinations, using consecutively assigned file numbers, destination telephone numbers, the total number of pages of the document to be transmitted, and the page information areas of the memory locations where the image data of the several pages are stored. I have found that these earlier efforts, as implemented, tend to be page oriented, frequently require a separate entry of information via a keypad for each page, and are not particularly convenient when used with several, discrete long multi-paged documents to be transmitted to different locations.

More recent efforts, such as represented by the *Apparatus With Selective Forwarding Of Facsimile And Voice Communications* be of H. Ide, U.S. Pat. No. 5,384,830, have tried to create a multimode facsimile by providing remote forwarding of lists of the contents of images stored in an image signal memory, with the list showing time, date, total number of pages of the stored image, and the transmitting terminal number. The list is separately stored, and is forwarded to a previously set designation, enabling the recipient, using a dual tone multifrequency generator, to selectivly initiate facsimile transmission from among the stored images represented by the list, those images that the recipient wants to be transferred. I have noticed that this accommodation of a remotely located user has neither simplified the local use of the facsimile apparatus by an operator nor significantly reduced the time required by the locally situated operator to store and transmit several, discrete long multipage documents to be transmitted to different locations.

SUMMARY OF THE INVENTION

Therefore, it is an object of the present invention to provide an improved telecommunications process and circuit for continuously and sequentially transmitting documents.

It is another object to provide a telecommunications process and circuit able to accept programming for transmitting different documents to different places sequentially.

It is still another object to provide an improved telecommunications process and circuit able to accommodate entry of a single program for transmission of multiple documents to different corresponding addresses, and to order a group designation and transmission of the documents.

It is yet another object to provide a telecommunications process and apparatus able to simplify the storage and subsequent transmission of several, discrete long multi-paged documents to different locations.

It is still yet another object to provide a telecommunications process and apparatus amenable to receive programming via a keypad for subsequent transmission of several, discrete long multi-paged documents to different locations.

It is another object to provide a telecommunications process and apparatus that simplifies both keypad programming and the subsequent sequential and continuous storage and transmission of several, discrete long multi-paged documents to different locations.

It is also an object to provide a telecommunications process and apparatus able to reduce the time required to scan and transmit several, discrete long multi-paged documents to numerous different locations.

These and other objects may be accomplished with a telecommunications process and circuit able to sequentially and continuously transmit documents to several different destinations when a plurality of documents are sent to different places, by inputting the number of pages and facsimile numbers for the corresponding destinations when the documents are inserted initially and there are at least two documents to transmit, by deciding whether the documents are to be sent to different places, by group-designating and registering facsimile numbers and the number of pages of those documents, and by then sequentially transmitting the group-designated and registered documents to their respective destinations.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
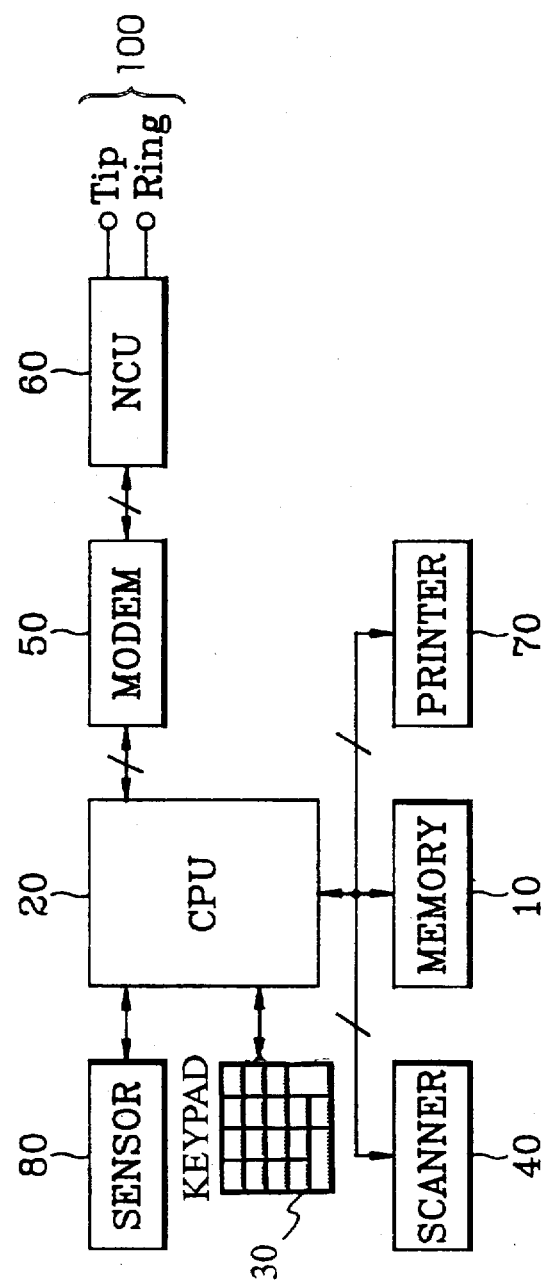
FIG. 1 is a block diagram of a facsimile telecommunication circuit configured for the practice of to the present invention.

Hereinafter, a preferred embodiment of the present invention will be described with reference to the attached drawings. Referring first to FIG. 1, a circuit for a facsimile telecommunications unit configured for the practice of the present invention, shows a central processing unit CPU 20 for controlling the system according to a predetermined program, a memory 10 for storing a program for transmission of a plurality of documents to their respective destinations, and for accessing data under the control of CPU 20. An operational keypad 30 has a plurality of keys to generate key data, such as function keys for the system. Scanner 40 scans and converts images appearing on documents into digital image data, and then provides the resulting digital image data to CPU 20. Modem 50 modulates the data from CPU 20 into analog data, and then demodulates the data it into binary data under the control of CPU 20. Network control unit (NCU) 60 forms a communication loop with a telephone line 100 to a central office under the control of CPU 20, and provides an interface between binary signals generated by the modem 50 and the signals carried by telephone line 100. Printer 70 prints images corresponding to data received, in accordance with control signals from CPU 20.

Figure 2A:
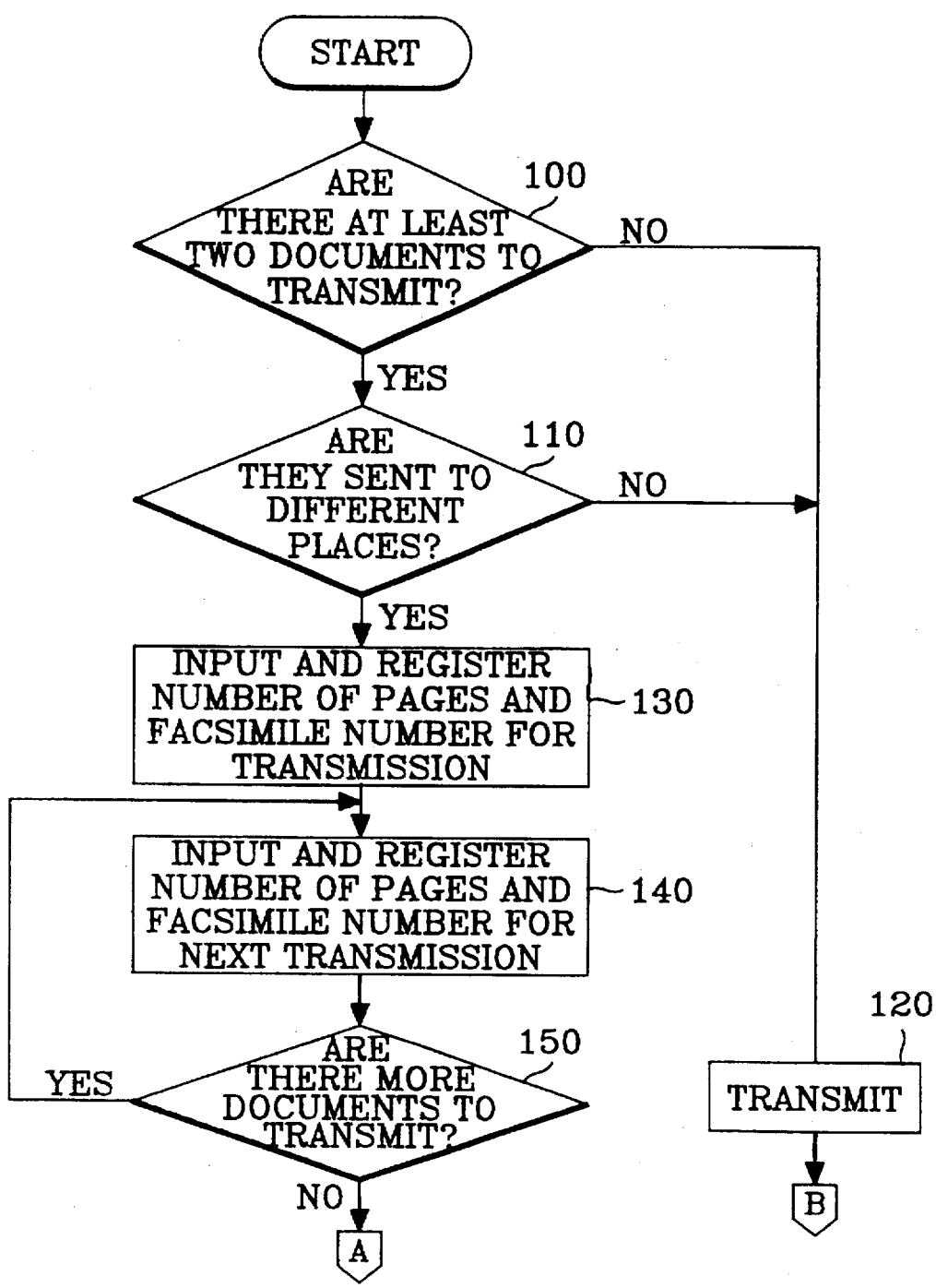
FIGS. 2A and 2B collectively provide a flowchart for controlling sequential and continuous transmission of documents to different places of reception according to the principle of the present invention.
Figure 2B:
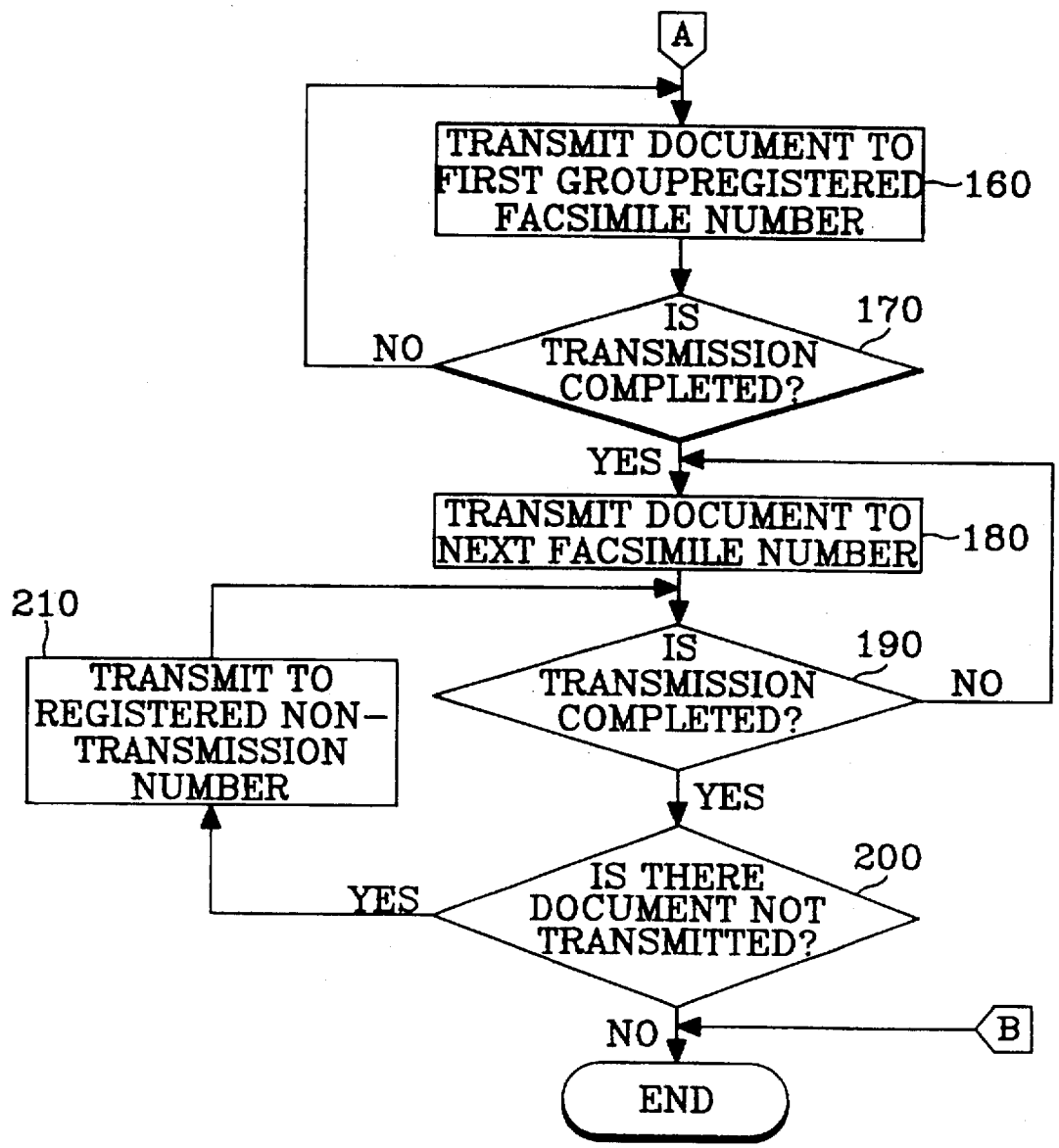

Referring now to FIGS. 2A and 2B, documents may be sequentially and continuously transmitted to different destinations in accordance with the principles of the present invention when CPU 20 determines that there are at least two documents to transmit, and when the documents are to be sent to different places, by group-designating and registering facsimile numbers for the several destinations and the number of pages of the documents, and then sequentially transmitting the group-designated and registered documents to their corresponding destinations.

The operation of the components shown in FIG. 1 will be explained with reference to FIGS. 2A and 2B. In step 100, CPU 20 detects through sensor 80 whether at least two documents are to be transmitted. In step 110, CPU 20 detects whether the intended destinations of the documents received from a user through keypad 30 are to be sent to different places, that is to different subscribers' facsimile telephone numbers. Here, in case that the intended destination for the documents are the same, transmission is performed in a general way, in step 120. If the destinations are determined to be different however, in step 130 the number of pages and facsimile number of the document to be first transmitted are group-designated through keypad 30, and then registered in memory 10. In step 140, the number of pages and facsimile number of the subscriber to receive the next to be transmitted document are group-designated and registered in memory 10. Thereafter, in step 150, CPU 20 detects whether there are more documents to transmit. Here, if CPU 20 detects via sensor 80 that there are more documents to be transmitted, step 140 is performed again. If CPU 20 determines that there are no more documents to transmit, the first document is transmitted to the first of the group-designated facsimile numbers in step 160. In step 170, CPU 20 detects whether the first document has been completely transmitted. If CPU 20 determines that the first of the documents has been completely transmitted, the next of the documents to be transmitted is then transmitted in step 180 to the subscriber designated by the next in the group-designated facsimile number.

Here, after determining in step 190 whether the next document has been completely transmitted, CPU 20 detects in step 200 whether there are documents that have not been transmitted. If CPU 20 determines in step 190 that transmission has been completed and that there are no more documents to be transmitted, transmission is finished. If however, CPU 20 determines in step 190 that there are additional documents to be transmitted, transmission to the subscriber corresponding to the next registered facsimile number is performed in step 210.

After CPU 20 determines in step 190 that the transmission of document has been completed, CPU 20 detects in step 200 whether there are other documents that have not been transmitted. If there are no other documents that have not been transmitted, transmission of those documents is completed, otherwise, step 210 is repeated.

As described above, the present invention provides a circuit and process for transmitting documents to different destinations for reception sequentially so that in case that several documents are sent to different respective places, different documents can be sent to their respective destinations sequentially in a single batch by inputting the number of pages and facsimile numbers for the places to receive those documents when the documents are initially inserted.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A telecommuncations process, comprising:
    reading into a memory binary data representing images borne by each page of a plurality of discrete multi-paged documents;
    entering into said memory values representing a number of pages of each of said documents for transmission to each address;
    entering into said memory facsimile numbers of subscribers for each of said addresses corresponding to each of said values;
    enabling an operator using a keypad to register as a group in said memory all of said values corresponding to a first one of said facsimile numbers;
    enabling the operator using the keypad to successively register as groups in said memory, each of said values corresponding to each different one of said facsimile numbers;

sequentially and continuously transmitting said documents registered within each of said groups to corresponding said facsimile numbers;

responding to a signal from a sensor indicating a number of said documents by making a first determination of how many documents have been read into said memory;

whenever said first determination establishes that not less than two of said documents have been read into said memory, making a second determination of whether said documents are to be transmitted to different subscriber numbers;

whenever said second determination established that not less than two of said documents are to be transmitted to different subscriber numbers; and then enabling the operator to register said groups in memory via a keypad.

2. The process of claim 1, further comprised of:

making a determination of whether all of said documents with said groups have been transmitted; and when all of said documents within said groups have been transmitted, making a determination of whether other documents not within said groups are awaiting transmission.

3. The process of claim 1, further comprised of:

making a third determination of whether all of said documents with said groups have been transmitted;

when said third determination establishes that all of said documents within said groups have been transmitted, making a fourth determination of whether another document not within said groups are awaiting transmission; and transmitting said other document when said fourth determination establishes a presence of said other document awaiting transmission.

4. A facsimile telecommunications apparatus, comprising:

a memory;

means for converting images born by successive documents into data signals representative of said images;

means for sensing numbers of the documents received by said converting means;

a modulation and demodulation stage for modulating said data signals into a second form of signals, and for demodulating said second form of signals into digital signals;

means for transmitting said digital signals to a single pair of electrically conducting leads;

a keypad bearing a plurality of manually operable keys; and a central processing unit connected to operationally respond to selective operation of said keys, by:

reading said data signals into said memory from a plurality of the successive documents;

entering into said memory values representing said numbers of each of said documents for transmission to each address of a plurality of addresses of facsimile subscribers;

entering into said memory facsimile numbers of the subscribers for each of said addresses;

responding to said selective operation of said keys by an operator using said keypad, by registering as a group in said memory all of said values corresponding to a first one of said facsimile numbers;

responding to subsequent selective operation of said keys by the operator using the keypad, by successively registering as groups in said memory, each of said values corresponding to each different one of said facsimile numbers; and sequentially and continuously transmitting all of said documents registered within each of said groups to successive corresponding ones of said facsimile numbers;

further comprised of said processing unit:

responding to a signal from said sensor by making a first determination of how many of the documents have been read into said memory;

whenever said first determination establishes that not less than two of the documents have been read into said memory making, a second determination of whether the documents are to be transmitted to different subscriber numbers;

whenever said second determination established that not less than two of the documents are to be transmitted to different subscriber numbers; and then enabling the operator to register said groups in memory via a keypad.

5. The apparatus of claim 4, further comprised of said processing unit:

making a determination of whether all of the documents with said groups have been transmitted; and when all of the documents within said groups have been transmitted, making a determination of whether other documents not within said groups are awaiting transmission.

6. The apparatus of claim 4, further comprised of said processing unit:

making a third determination of whether all of the documents with said groups have been transmitted;

when said third determination establishes that all of the documents within said groups have been transmitted, making a fourth determination of whether another document not within said groups are awaiting transmission; and transmitting said other document when said fourth determination establishes a presence of said other document awaiting transmission.

* * * * *